United States Patent
Rajkotia et al.

(10) Patent No.: US 7,392,049 B2
(45) Date of Patent: Jun. 24, 2008

(54) WIRELESS NETWORK AND METHOD FOR PROVIDING ENHANCED PACKET DATA SERVICES BETWEEN MOBILE STATIONS

(75) Inventors: Purva R. Rajkotia, Plano, TX (US); Vijayasimman Rajasimman, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 944 days.

(21) Appl. No.: 10/743,341

(22) Filed: Dec. 19, 2003

(65) Prior Publication Data

US 2005/0135334 A1   Jun. 23, 2005

(51) Int. Cl.
*H04Q 7/20* (2006.01)
(52) U.S. Cl. ............... 455/435.2; 370/331; 370/401; 370/352
(58) Field of Classification Search ................. 370/352
See application file for complete search history.

(56) References Cited

U.S. PATENT DOCUMENTS

| | | | |
|---|---|---|---|
| 6,424,639 B1* | 7/2002 | Lioy et al. | 370/338 |
| 6,697,355 B1* | 2/2004 | Lim | 370/352 |
| 7,092,712 B2* | 8/2006 | Holmes et al. | 455/445 |
| 2004/0042423 A1* | 3/2004 | Borella et al. | 370/328 |
| 2006/0291415 A1* | 12/2006 | Xu | 370/331 |

\* cited by examiner

*Primary Examiner*—Creighton H Smith

(57) ABSTRACT

A method of terminating a packet data call at a target mobile station (MS) operating in the wireless network. The method comprises the steps of: i) receiving in a PDSN of the wireless network first packet data directed to the target MS; ii) identifying in the first packet data a mobile identification number of the target MS; iii) using the mobile identification number to retrieve an IP address of the target mobile station from a first database of the PDSN; and iv) forwarding the first packet data to the target mobile station using the retrieved IP address. The method further comprises the step of determining from a second database of the PDSN a target PCF unit and a target base station controller with which the target MS is currently in communication.

17 Claims, 3 Drawing Sheets

WIRELESS NETWORK AND METHOD FOR PROVIDING ENHANCED PACKET DATA SERVICES BETWEEN MOBILE STATIONS

TECHNICAL FIELD OF THE INVENTION

The present invention generally relates to packet data services in wireless networks and, more specifically, to a wireless network that allows packet data call termination at a mobile station and packet data calls between mobile stations.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. The price of wireless devices has decreased to the point where these devices are affordable to nearly everyone and the price of a wireless device is only a small part of the total cost to the user (i.e., subscriber). To continue to attract new customers, wireless service providers are implementing new services, especially digital data services that, for example, enable a user to browse the Internet and to send and receive e-mail.

Conventional wireless networks provide packet data call services using control signals that connect the base station (BS) serving the mobile station (MS) that originates a packet data call to a packet data serving node (PDSN). All data transmitted by the source mobile station is transferred through the PDSN into a packet data network, such as the Internet. Unfortunately, conventional wireless networks do not support packet data call services in which the packet data call is terminated on a mobile station. Prior art mobile stations are only capable of originating packet data calls.

Therefore, there is a need for packet data services in a wireless network that are more flexible and more user-friendly. In particular, there is a need in the art for wireless networks that support mobile station-terminated packet data services. More particularly, there is a need for wireless networks that provide mobile station-to-mobile station (MS-MS) packet data connections.

SUMMARY OF THE INVENTION

The present invention provides a wireless network that allows packet data call termination at a mobile station. Advantageously, this facilitates mobile station-to-mobile station (MS-MS) packet data call services.

To address the above-discussed deficiencies of the prior art, it is a primary object of the present invention to provide, for use in a wireless network, a method of terminating a packet data call at a target mobile station operating in the wireless network. According to an advantageous embodiment of the present invention, the method comprises the steps of: i) receiving in a packet data server node of the wireless network first packet data directed to the target mobile station; ii) identifying in the first packet data a mobile identification number associated with the target mobile station; iii) using the mobile identification number to retrieve an IP address of the target mobile station from a first database associated with the packet data server node; and iv) forwarding the first packet data to the target mobile station using the retrieved IP address.

According to one embodiment of the present invention, the method further comprises the step of determining from a second database associated with the packet data server node a target packet controller function unit with which the target mobile station is currently in communication.

According to another embodiment of the present invention, the method further comprises the step of determining from the second database associated with the packet data server node a target base station controller with which the target mobile station is currently in communication.

According to still another embodiment of the present invention, the method further comprises the step of transmitting a Registration Request message from the packet data server node to the target base station controller, the Registration Request message capable of causing the target base station controller to establish a first traffic channel to the target mobile station.

According to yet another embodiment of the present invention, the method further comprises the step of transmitting a Registration Response message from the target base station controller to the packet data server nodes after the first traffic channel has been established.

According to a further embodiment of the present invention, the method further comprises the step of establishing a Point-to-Point Protocol (PPP) connection between the packet data server node and the target mobile station.

According to a still further embodiment of the present invention, the method further comprises the step of receiving in the packet data server node subsequent packet data directed to the target mobile station and adding the IP address of the target mobile station to the received subsequent packet data.

According to a yet further embodiment of the present invention, the method further comprises the step of transmitting the received subsequent packet data from the packet data server node to the target mobile station via the PPP connection.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
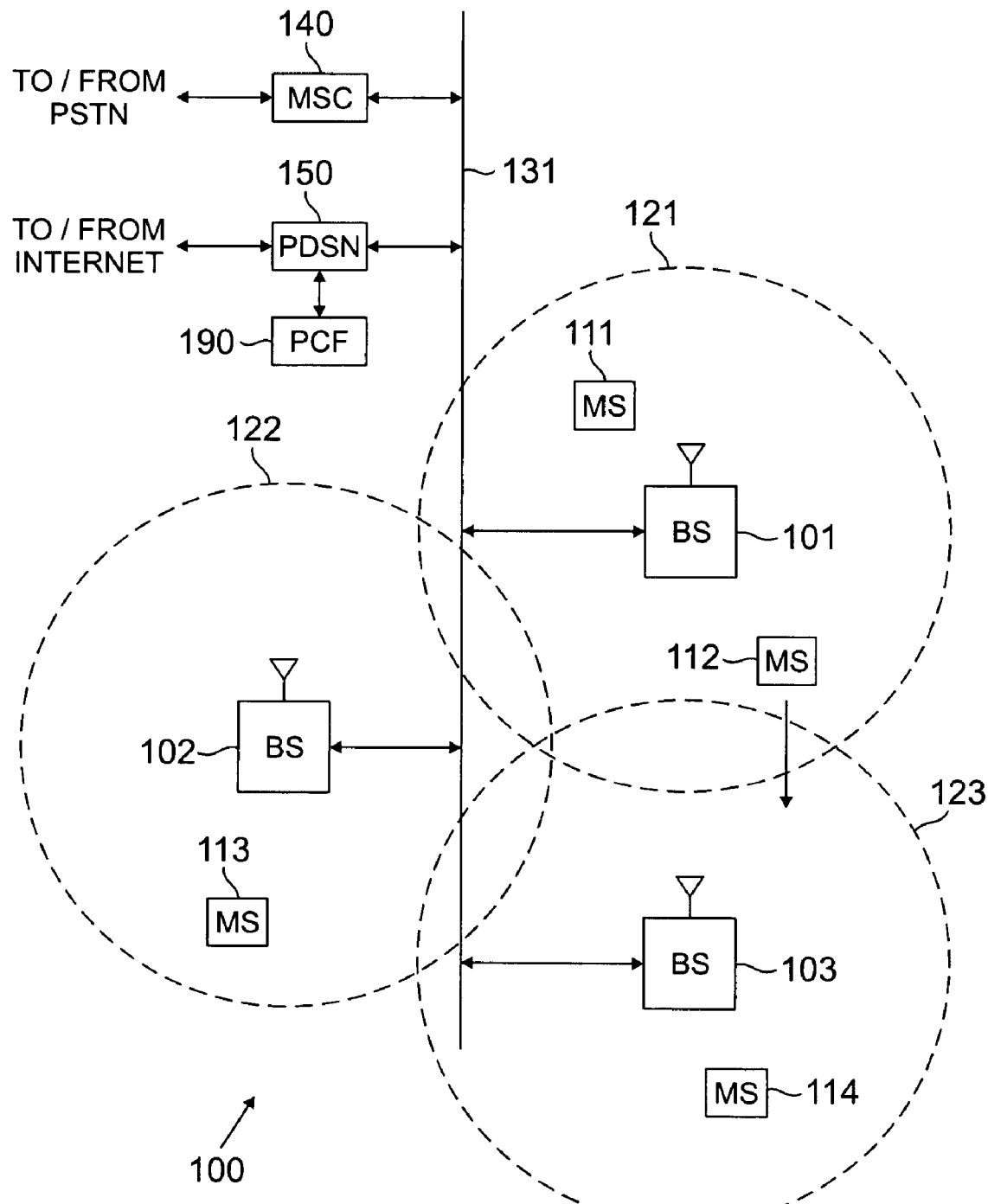
FIG. 1 illustrates a wireless network that provides enhanced packet data services between mobile stations according to the principles of the present invention.
Figure 2:
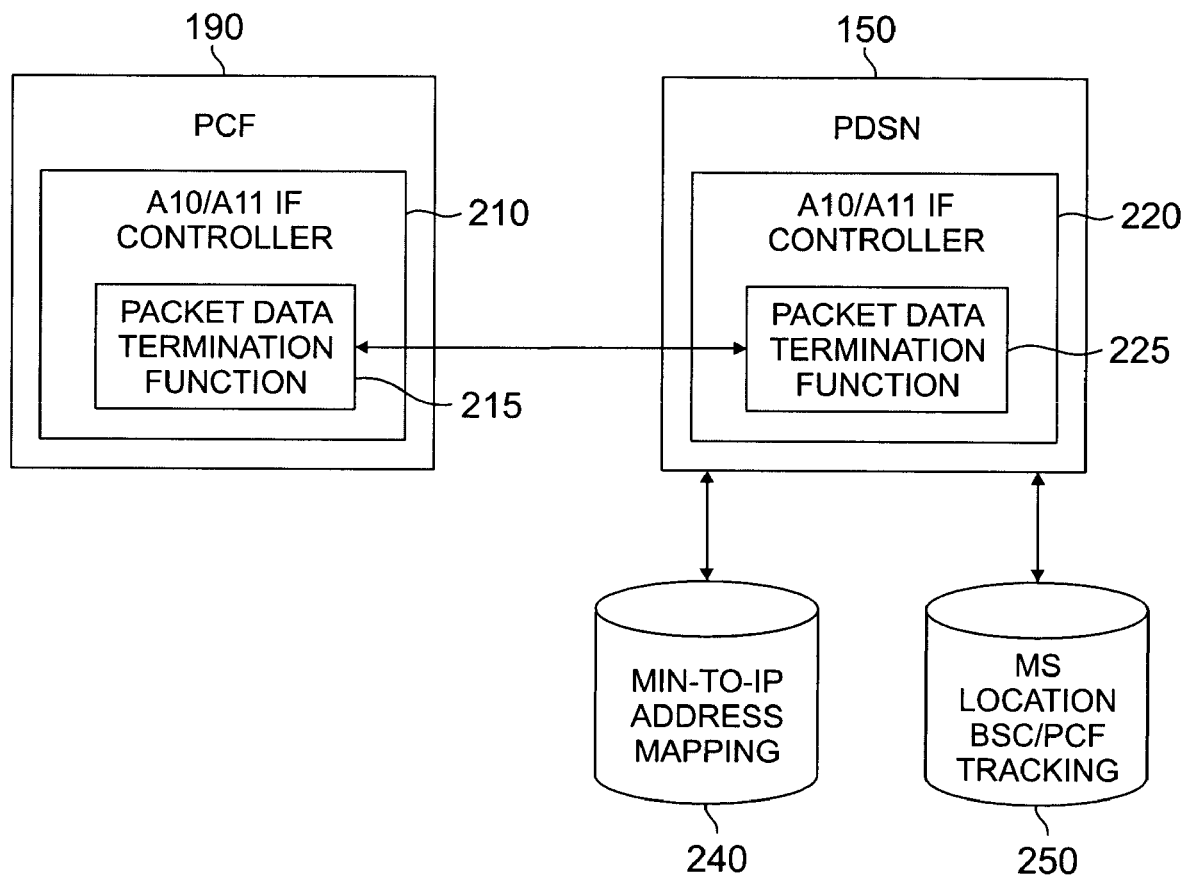
FIG. 2 illustrates selected portions of the wireless network in FIG. 1 in greater detail according to the principles of the present invention.
Figure 3:
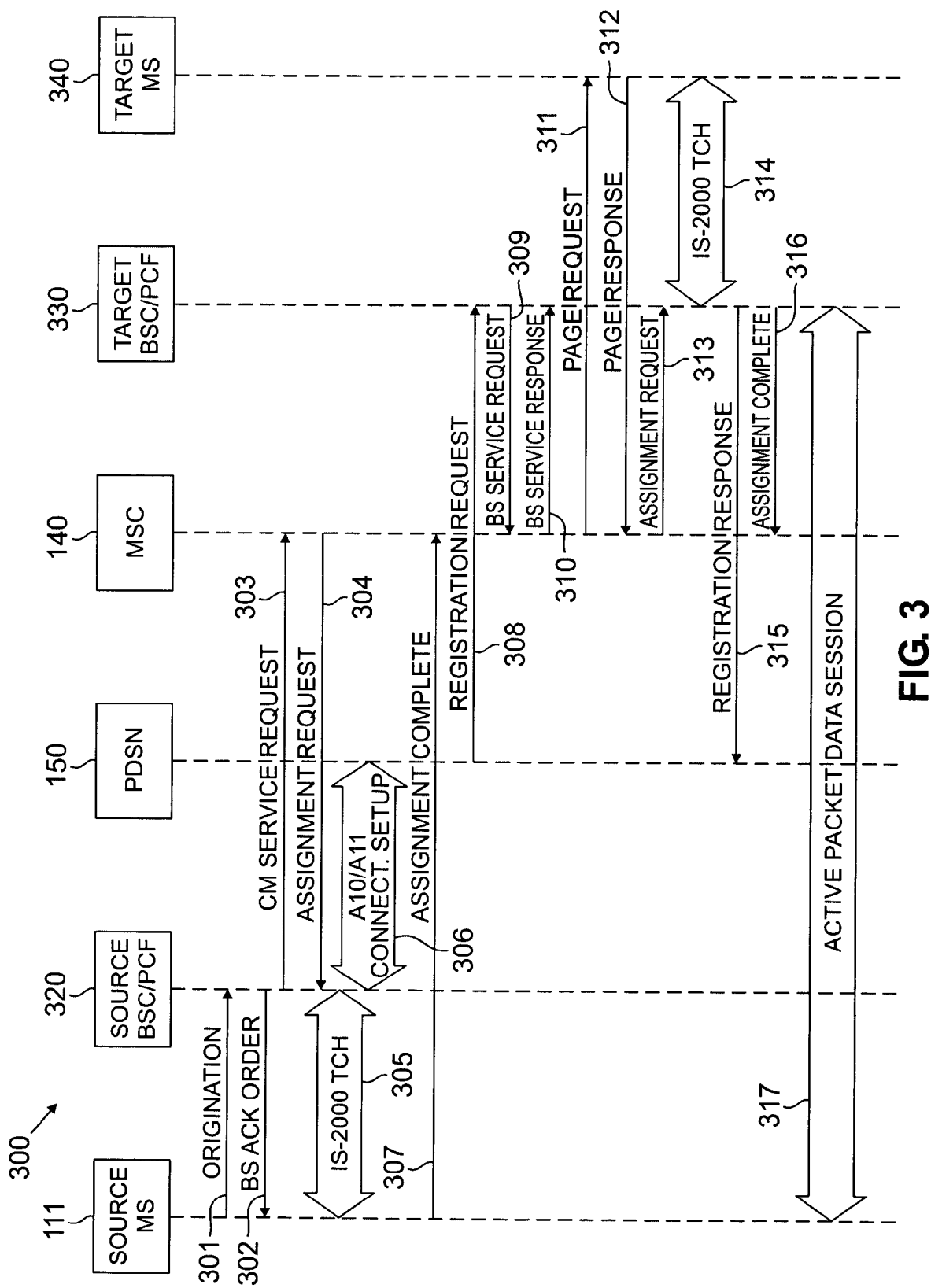
FIG. 3 is a message flow diagram illustrating the termination of a call connection on a base station in the wireless network according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100, which provides enhanced packet data services between mobile stations according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000-C standard (i.e., Release C of cdma2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a handoff will occur.

According to the principles of the present invention, wireless network 100 provides packet data services and wireless networks 100 is capable of terminating packet data calls at a mobile station. Advantageously, this allows a packet data call connection to be set up from a source (or originating) mobile station to a target (or destination) mobile station. This capability if useful for implementing, for example, a voice-over-IP (VoIP) application. Implementing the present invention requires changes to the functionality of packet control function (PCF) unit 190 and packet data server node (PDSN) 150.

FIG. 2 illustrates selected portions of wireless network 100 in greater detail according to the principles of the present invention. Packet control function (PCF) unit 190 comprises A10/A11 interface (IF) controller 210 and packet data server node (PDSN) 150 comprises A10/A11 Interface (IF) controller 220. A10/A11 IF controller 210 has been modified to include packet data termination function 215. Similarly, A10/A11 IF controller 220 has been modified to include packet data termination function 225. Packet data termination function 215 and packet data termination function 225 enable A10/A11 IF controller 210 and A10/A11 IF controller 220 to terminate a packet data call on a mobile station, a capability that is absent in the prior art.

In order to terminate the call at a mobile station, the address of the terminating mobile station must be known. The address may be the mobile identification number (MIN) of the terminating mobile station or the IP address of the terminating mobile station. According to an exemplary embodiment of the present invention, PDSN 150 accesses a database that maps the MIN (e.g., IMSI value) of a mobile station to the IP address of the mobile station. This database is represented by MIN-to-IP address mapping database 240. MIN-to-IP address mapping database 240 may be directly coupled to PDSN 150. Alternatively, PDSN 150 may access remotely disposed MIN-to-IP address mapping database 240 via the Internet.

According to an exemplary embodiment of the present invention, PDSN 150 also accesses a database that tracks the local BSC and/or local PCF unit with which each active mobile station is currently communicating. This database is represented by MS location BSC/PCF tracking database 250. MS location BSC/PCG tracking database 250 may be directly coupled to PDSN 150. Alternatively, PDSN 150 may access remotely disposed MS location BSC/PCF tracking database 250 via the Internet.

FIG. 3 depicts message flow diagram 300, which illustrates the termination of a call connection on a base station in wireless network 100 according to the principles of the present invention. In FIG. 3, it is assumed that source mobile station (MS) 111 is originating a packet data call that is to be terminated on target mobile station (MS) 340. However, those skilled in the art will understand that this is not required. In alternate embodiments, some other processing system, such as a server or personal computer (PC), may originate a packet data call connection that is to be terminated on target MS 340.

Also, for the sake of simplicity, it is assumed that the packet control function (PCF) unit is part of the base station controller (BSC). Hence, the PCF unit and the BSC associated with source MS 111 are collectively represented as source BSC/PCF 320 and the PCF unit and the BSC associated with target MS 340 are collectively represented as target BSC/PCF 330.

Initially, the user of source mobile station (MS) 111 originates a packet data call that will be terminated on target mobile station (MS) 340 by dialing the mobile identification number (MIN) of target MS 340. According to conventional IS-2000 protocol, source MS 111 transmits Origination message 301 to the base station in source BSC/PCF 320, which responds by transmitting a Base Station Acknowledgement (BS ACK) Order message 302 back to source MS 111. The base station of source BSC/PCF 320 also transmits CM Service Request message 303 to MSC 140, which responds by transmitting Assignment Request message 304 back to source BSC/PCF 320. Thereafter, the base station portion of source BSC/PCF 320 and source MS 111 execute IS-2000 traffic channel (TCH) setup procedure 305.

After traffic channel setup is complete, the BSC portion of BSC/PCF 320 triggers A10/A11 connection setup procedure 306 with PDSN 150. Source MS 111 also transmits Assignment Complete message 307 to MSC 140. Unlike conventional IS-2000 protocol messages, the A11 Registration message according to the principles of the present invention contains the dialed digits (MIN) of target MS 340. PDSN 150 accesses MS location BSC/PCF tracking database 250 to determine the PCF and BSC with which target BS 340 is currently communicating (i.e., network location). PDSN 150 also accesses MIN-to-IP address mapping database 240 to map the dialed digits of target MS 340 to the IP address associated with target MS 340.

Next, PDSN 150 transmits Registration Request message 308 to target BSC/PCF 330 associated with target MS 340. Then, the BSC portion of target BSC/PCF 330 transmits sends BS Service Request message 309 to MSC 140. MSC 140 responds by transmitting BS Service Response message 310 to the BSC portion of target BSC/PCF 330. MSC 140 also transmits Page Request message 311 to target MS 340. Target MS 340 responds by transmitting Page Response message 312 to MSC 140. MSC 312 then transmits Assignment Request message 313 to the BSC portion of target BSC/PCF 330. Thereafter, the BSC portion of target BSC/PCF 330 and target MS 340 execute IS-2000 traffic channel (TCH) setup procedure 314.

Once traffic channels are established for target MS 340, target BSC/PCF 330 transmits Registration Response message 315 to PDSN 150. Target BSC/PCF 330 also transmits Assignment Complete message 316 to MSC 140. At this point, a point-to-point protocol (PPP) connection is established between target MS 340 and PDSN 150. Active packet data session 317 indicates that source MS 111 transmits to PDSN 150 IP packets that have the destination address of PDSN 150, and PDSN 150 then forwards the IP packets from source MS 111 to target MS 340.

One application of the present invention that is particularly useful is VoIP (Voice Over IP). In VoIP, the source mobile station makes the call to other user to talk. The VoIP application is a packet data application where the call is initiated using either SO33 or SO60/SO61. The caller is unaware that the call is packet data call. Just like for other types of voice calls, the user dials the number of the target mobile station. Under that scenario, the packet data call must terminate on a target mobile station.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a method of terminating a packet data call at a target mobile station operating in the wireless network, the method comprising the steps of:
    receiving in a packet data server node of the wireless network first packet data directed to the target mobile station;
    identifying in the first packet data a mobile identification number associated with the target mobile station;
    using the mobile identification number to retrieve an IP address of the target mobile station from a first database associated with the packet data server node;
    forwarding the first packet data to the target mobile station using the retrieved IP address; and
    determining from a second database associated with the packet data server node a target packet controller function unit with which the target mobile station is currently in communication.

2. The method as set forth in claim 1 further comprising the step of determining from the second database associated with the packet data server node a target base station controller with which the target mobile station is currently in communication.

3. The method as set forth in claim 2 further comprising the step of transmitting a Registration Request message from the packet data server node to the target base station controller, the Registration Request message capable of causing the target base station controller to establish a first traffic channel to the target mobile station.

4. The method as set forth in claim 3 further comprising the step of transmitting a Registration Response message from the target base station controller to the packet data server nodes after the first traffic channel has been established.

5. The method as set forth in claim 4 further comprising the step of establishing a Point-to-Point Protocol (PPP) connection between the packet data server node and the target mobile station.

6. The method as set forth in claim 5 further comprising the step of receiving in the packet data server node subsequent packet data directed to the target mobile station and adding the IP address of the target mobile station to the received subsequent packet data.

7. The method as set forth in claim 6 further comprising the step of transmitting the received subsequent packet data from the packet data server node to the target mobile station via the PPP connection.

8. A wireless network capable of terminating a packet data call at a target mobile station operating in the wireless network, the wireless network comprising:
    a plurality of base stations capable of communicating with a plurality of mobile station in a coverage area of the wireless network; and
    a packet data server node capable of receiving first packet data directed to the target mobile station and identifying in the first packet data a mobile identification number associated with the target mobile station, wherein the packet data server nodes uses the mobile identification number to retrieve an IP address of the target mobile station from a first database associated with the packet data server node and forwards the first packet data to the target mobile station using the retrieved IP address, and wherein the packet data server node determines from a second database associated with the packet data server node a target packet controller function unit with which the target mobile station is currently in communication.

9. The wireless network as set forth in claim 8 wherein the packet data server node determines from the second database associated with the packet data server node a target base station controller with which the target mobile station is currently in communication.

10. The wireless network as set forth in claim 9 wherein the packet data server node transmits a Registration Request message to the target base station controller, the Registration Request message capable of causing the target base station controller to establish a first traffic channel to the target mobile station.

11. The wireless network as set forth in claim 10 wherein the packet data server node is capable of receiving a Registration Response message from the target base station controller after the first traffic channel has been established.

12. The wireless network as set forth in claim 11 wherein the packet data server node is capable of establishing a Point-to-Point Protocol (PPP) connection between the packet data server node and the target mobile station.

13. The wireless network as set forth in claim 12 wherein the packet data server node is capable of receiving subsequent packet data directed to the target mobile station and adding the IP address of the target mobile station to the received subsequent packet data.

14. The wireless network as set forth in claim 13 wherein the packet data server node is capable of transmitting the received subsequent packet data from the packet data server node to the target mobile station via the PPP connection.

15. A packet data server node for use in wireless network capable of terminating a packet data call at a target mobile station operating in the wireless network, wherein the packet data server node is capable of receiving first packet data directed to the target mobile station and identifying in the first packet data a mobile identification number associated with the target mobile station, wherein the packet data server nodes uses the mobile identification number to retrieve an IP address of the target mobile station from a first database associated with the packet data server node and forwards the first packet data to the target mobile station using the retrieved IP address, and wherein the packet data server node determines from a second database associated with the packet data server node a target packet controller function unit with which the target mobile station is currently in communication.

16. The packet data server node as set forth in claim 15 wherein the packet data server node determines from the second database associated with the packet data server node a target base station controller with which the target mobile station is currently in communication.

17. The packet data server node as set forth in claim 16 wherein the packet data server node transmits a Registration Request message to the target base station controller, the Registration Request message capable of causing the target base station controller to establish a first traffic channel to the target mobile station.

* * * * *